United States Patent
Herrington et al.

(10) Patent No.: US 6,261,464 B1
(45) Date of Patent: Jul. 17, 2001

(54) PORTABLE WATER DISINFECTION SYSTEM

(75) Inventors: Rodney E. Herrington; Curtis M. Mitchke; John K. Hickerson, all of Albuquerque; Timothy A. Cushman, Sandia Park; John F. White, Rio Ranch, all of NM (US)

(73) Assignee: Miox Corporation, Albuquerque, NM (US)

( * ) Notice: Subject to any disclaimer, the term of this patent is extended or adjusted under 35 U.S.C. 154(b) by 0 days.

(21) Appl. No.: 09/318,468

(22) Filed: May 25, 1999

(51) Int. Cl.[7] ............................ C02F 1/46; C02F 1/72
(52) U.S. Cl. .................... 210/758; 210/192; 210/244; 204/194; 204/232; 204/271; 204/275
(58) Field of Search ........................ 210/739, 748, 210/758, 764, 85, 244, 192; 204/194, 400, 232, 242, 271, 272, 275

(56) References Cited

U.S. PATENT DOCUMENTS

| | | |
|---|---|---|
| 1,200,165 | 10/1916 | Burgess . |
| 3,222,269 | 12/1965 | Stanton . |
| 3,622,479 | 11/1971 | Schneider . |
| 4,290,873 | 9/1981 | Weaver . |
| 4,306,952 | 12/1981 | Jansen . |
| 4,496,443 * | 1/1985 | Mack et al. ..................... 204/130 |
| 4,560,455 | 12/1985 | Porta et al. . |
| 4,744,877 | 5/1988 | Maddock . |
| 4,761,208 | 8/1988 | Gram et al. . |
| 4,786,380 | 11/1988 | van Duin et al. . |
| 4,790,923 | 12/1988 | Stillman . |
| 4,790,946 | 12/1988 | Jansen . |
| 4,976,842 | 12/1990 | Fowler . |
| 5,085,753 * | 2/1992 | Sherman ........................ 204/271 |
| 5,320,718 * | 6/1994 | Molter et al. .................. 204/101 |
| 5,581,189 * | 12/1996 | Brenn ............................ 204/402 |
| 5,795,459 | 8/1998 | Sweeney . |
| 5,958,229 * | 9/1999 | Filiopoulos et al. ............ 210/192 |
| 5,989,396 * | 11/1999 | Prasnikar et al. ............... 204/290 |
| 6,007,686 * | 12/1999 | Welch et al. .................... 204/271 |

OTHER PUBLICATIONS

Venczel et al. "Inactivation of Cryptosporidium pervum Oocysts and Clostridium perfringens Spores by a Mixed–Oxidant Disinfectant and by Free Chlorine." Applied and Environmental Microbiology, Apr., 1997, pp. 1598–1601.

Hydro–Photon Inc. web site describing "Steri–Pen" www.hydro–photon.com.

* cited by examiner

Primary Examiner—David A. Simmons
Assistant Examiner—Betsey Morrison Hoey
(74) Attorney, Agent, or Firm—Nancy E. Ownbey; Deborah A. Peacock; Brian J. Pangrle

(57) ABSTRACT

A portable oxidant generator for generating a chlorine or chloro-oxygen solution suitable for sterilizing contaminated drinking water, thereby providing potable water. The oxidant generators include an electrolytic chamber and a power supply or source. The chamber holds a salt brine solution such that the solution is in contact with an anode and cathode included in the chamber. The power supply provides electrical charge which is passed between the anode and cathode through the salt brine solution. In the preferred embodiment of the present invention, the power supply includes an energy storage device that is charged to predetermined voltage. The energy storage device is preferably charged by a generator that converts mechanical energy into electrical energy. The present invention includes a brine storage compartment in the cap. The present invention also includes a total dissolved solids measuring device to determine if the water to be treated requires reverse osmosis filtration to remove high concentrations of ions from the source water to be treated.

117 Claims, 11 Drawing Sheets

PORTABLE WATER DISINFECTION SYSTEM

GOVERNMENT RIGHTS

The U.S. Government has a paid-up license in this invention and the right in limited circumstances to require the patent owner to license others on reasonable terms as provided for by the terms of Contract No. DABT63-98-C-0052 awarded by U.S. Defense Advanced Research Projects Agency.

FIELD OF THE INVENTION

The present invention relates to water disinfecting systems, and more particularly, to a device for generating disinfecting solutions to be added to potentially contaminated water to render that water potable.

BACKGROUND OF THE INVENTION

Maintaining the sterility of drinking water supplies is a major factor in reducing the health risks to human populations. While large metropolitan water systems can make use of highly toxic chlorine gas for sterilizing drinking water, such systems are impractical in remote locations, which lack highly trained personnel and the equipment to maintain the systems. There are many settings in which sophisticated systems are not practical. For example, campers or military personnel in the field cannot be expected to operate such a system to provide potable drinking water from streams or other potentially contaminated water sources. To be effective in such rural settings, a system must be capable of running for long periods of time with little or no maintenance. In addition, the raw materials required by the system must be readily available.

Systems based on the electrolytic production of chlorine and/or other chloro-oxygen species based germicidal agents are particularly attractive for use in the present invention. These systems require only electricity and common salt as raw materials. One such system is described in U.S. Pat. No. 4,761,208 to Gram, et al. entitled *Electrolytic Method and Cell for Sterilizing Water*, which is incorporated herein by reference. The system of the present invention utilizes an electrolytic cell to generate an oxidant solution including chlorine in the form of hypochlorous acid and other chloro-oxygen species. Other embodiments of the present invention produce an oxidant solution that is predominantly sodium hypochlorite. The oxidant solution is produced from a brine solution using common salt. This oxidant solution may be added directly to the drinking water at a dilution ratio compatible with the concentration of the oxidant produced in the device and the demand of the water. The oxidant produced is more effective at inactivation of micro-organisms than is conventional chlorination technology, including chlorine gas, sodium hypochlorite, and calcium hypochlorite. At adequate dilution ratios, the water is sterilized without causing the water to become unpalatable. This technology is particularly attractive because of its simplicity and long maintenance free operation time. Studies have been conducted to demonstrate the micro-organism inactivation effectiveness of the oxidant, commonly referred to as mixed-oxidant solution. Linda V. Venczel, Michael Arrowood, Margaret Hurd, and Mark D. Sobsey with the University of North Carolina at Chapel Hill, N.C. have conducted research and published a paper entitled, *Inactivation of Cryptosporidium parvum Oocysts and Clostridium Perfringens Spores by a Mixed-Oxidant Disinfectant and by Free Chlorine*, published in *Applied and Environmental Microbiology*, Apr. 1997, p. 1598–1601.

The systems based on mixed-oxidant production have been used successfully in rural communities with small water supplies to larger municipal water systems treating millions of gallons per day. These larger systems are not well suited for use by individual campers and personnel in the field who must treat small quantities of water on a daily basis. The mixed oxidant systems designed to date are applicable to large quantities of water and are large and heavy. In addition, these systems require quantities of electrical power that are not practical at the mesoscale, or individual person level.

SUMMARY OF THE INVENTION

The preferred embodiment of the present invention comprises an apparatus to treat a a substance, the apparatus comprising a portable electrolytic cell for generating oxidation/reduction products, the products to be subsequently added to the substance. The apparatus preferably comprises a syringe-like configuration. Preferably, the electrolytic cell comprises a plurality of plates, more preferably an anode and a cathode. Preferably the adode comprises a catalytic material, more preferably a titanium substrate preferably with an oxide coating, more preferably at least one metal selected from the group VIII elements of the Periodic Table of the Elements, and most preferably wherein the oxide coating comprises ruthenium.

In a preferred embodiment of the present invention, the cathode is disposed within the anode, alternatively where the anode is disposed adjacent to the cathode and preferably comprises an outer housing for the anode, preferably wherein at least one of the anode or cathode comprises a metallic, plastic, ceramic, silicone, or a non-conducting material. The preferred embodiment also preferably comprises a pocket clip for attachment to the user's pocket. The electrolytic cell preferably comprises a delivery mechanism for adding oxidation/reduction products to the substance, and preferably comprises a power source comprising an electrical, electro-mechanical, or chemical generator. The power source preferably additionally comprises a generator to convert mechanical energy to electrical energy.

In a preferred embodiment of the present invention the apparatus comprises a reservoir, preferably a salt reservoir, and more preferably a refillable or disposable reservoir. Preferably, the chamber comprises a reservoir. A preferred embodiment further comprises an electrolyte storage compartment comprising a self-sealing cap. The cap comprises an elastomer or a mechanical check valve.

A preferred embodiment of the present invention further comprises a deposit-removing apparatus, preferably a scraper and/or a shaft comprising break-away segments. The apparatus also preferably comprises a circuit for measuring total dissolved solids (TDS) in the substance to be treated, preferably an electrical circuit included in an integral circuit, and preferably further comprises a visually readable, audible, or tactile indicator for completion of electric charge in the substance, most preferably a vibratory indicator. The apparatus preferably additionally comprises a temperature measuring device.

The present invention is also a method for treating a substance using an oxidant generator comprising the steps of creating oxidation/reduction products in a portable electrolytic cell for holding an electrolyte, and releasing the products onto a substance for treating. Preferably, the oxidants are released onto a fluid, and more preferably the oxidants are released for decontaminating. The oxidants are preferably created by passing water through a porous salt chamber to be collected in the cell, preferably by passing an electric current through an electrolyte, and more preferably by generating an electric current from an anode to a cathode, and alternatively in an electrolytic cell comprising a plurality of plates. Preferably the anode comprises a catalytic material, preferably a titanium substrate. The anode preferably further comprises an oxide coating, and preferably comprises at least one metal selected from the Group VIII materials in the Periodic Table of the Elements, and more preferably comprises ruthenium oxide. In the preferred embodiment of the present invention, the oxidation/reduction products are created in a reservoir.

Broadly, it is the object of the present invention to provide an improved oxidant generator.

It is a further object of the present invention to provide an oxidant generator that may be carried conveniently by a single person and utilized to sterilize small quantities of drinking water.

A primary advantage of the present invention is the small size and light weight of the apparatus.

Another advantage of the present invention is the ability to measure total dissolved solids in the sample with the same apparatus to treat the water.

Yet another advantage of the present invention is the ability to treat a larger volume of water using a portable apparatus.

A further advantage of the present invention is the use of a safe-to-produce solution to disinfect a water supply.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

In the claims and specification of the present invention, the term decontaminate is used herein to describe a process whereby pathogenic micro-organisms are inactivated to render a source of water potable. Likewise, decontaminate also applies to a chemical process whereby the oxidant product of the disinfection device can react chemically with other toxic chemicals so that the resulting reaction products are not harmful for human contact or consumption. Portability refers to a device that can physically be moved by one or more humans. The present invention is a portable, batch mode, oxidant generator that generates an aliquot of oxidant solution that can be added to water in a canteen or other storage container to provide drinking water. The invention requires only that the user have a source of salt. In the preferred embodiment of the invention shown in FIG. 1 and FIG. 2, a quantity of salt sufficient for several days of field use is included in the apparatus of the present invention. In another embodiment of the present invention, a brine solution pre-made to the correct concentration is stored in a capsule in the cap and is accessed by the apparatus through a re-sealable opening in the end of the capsule. Other embodiments that utilize conventional salt carried by back packers and military personnel may also be utilized as explained below.

Figure 3:
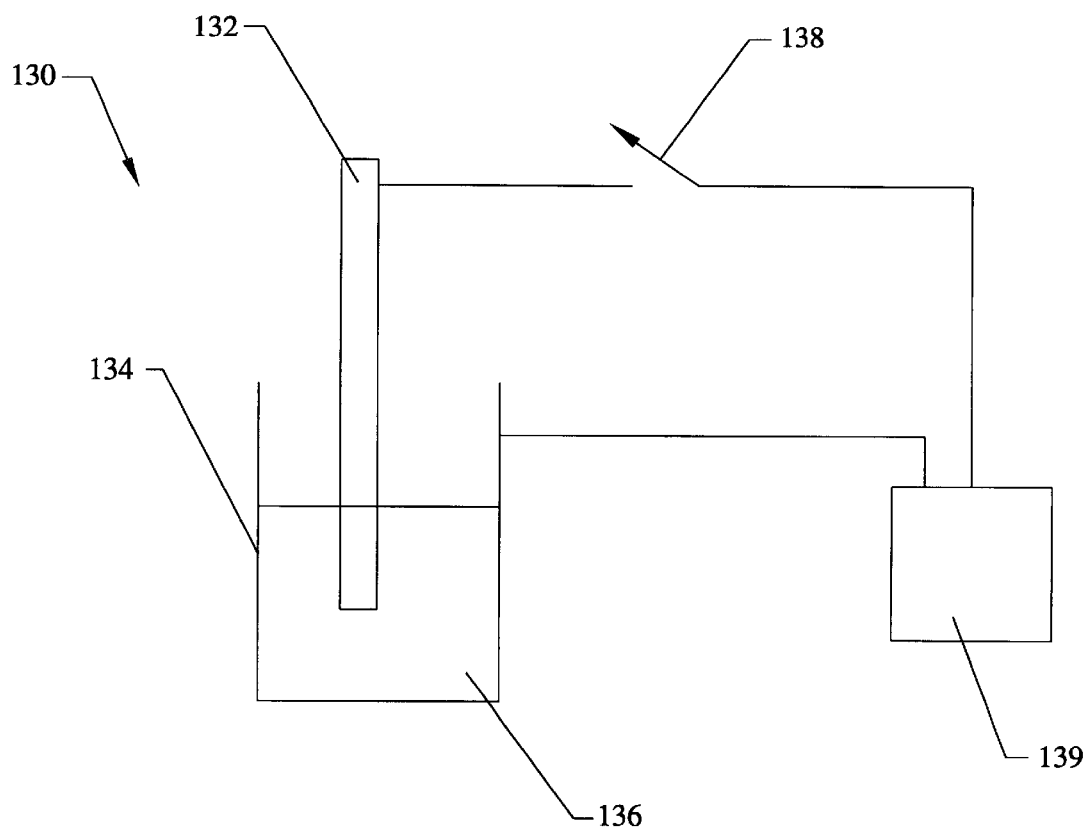
FIG. 3 is a schematic view of an oxidant generator according to the present invention.

The present invention is based on the electrical chemical reactions that take place when a current is passed through a salt solution between an anode and cathode located in the solution. The manner in which the present invention operates may be more easily understood with reference to FIG. 3, which is a schematic view of oxidant generator 130. Brine solution 136 is subjected to electrolytic decomposition by passing a current from power source 139 between anode 134 and cathode 132. The chemical species generated, in general, depends on the material from which anode 134 is constructed, as well as the electrical potential across anode 134 and cathode 132, and fluid conditions in the cell. The preferred anode materials are a titanium substrate with an oxide coating of Group VIII metals such as platinum, iridium, rhodium, or ruthenium, although other typical anode materials may be utilized in accordance with the present invention. In addition to being highly reactive catalytic compounds that produce products with good germicidal properties, these are highly resistant to corrosion and do not dissolve easily. Coatings can be applied in a number of fashions including painting or spraying followed by oven baking. Coatings can also be applied by deposition and other methods known to those versed in the art and commonly applied in industry.

The quantity of oxidant generated depends primarily on the quantity of current that passes through the salt solution for a wide range of salt solution concentrations. The present invention utilizes this observation to simplify the control of the quantity of oxidant generated. For the purposes of the explanation of the present invention, it is sufficient to observe that switch 138 is closed for a period of time that is sufficient to allow a predetermined amount of charge to flow between anode 134 and cathode 132. After this amount of charge has passed between the electrodes, brine solution 136 contains a predetermined amount of oxidants. This solution is then added directly to a predetermined amount of drinking water, such as the water in a canteen, which provides a prescribed oxidant dose to the water.

The oxidant solution generated by the present invention is highly concentrated. This solution is typically added at a dilution ratio of 2000:1. Accordingly, only about 0.5 milliliter (ml)of brine needs to be processed to provide disinfectant for, e.g. a liter of drinking water. Brine solution 136 having a salt concentration of from fractions of a percent to fully saturated is sufficient for the purpose of the present invention. Hence, a few grams of salt are sufficient to provide an individual with potable water for several weeks. Since individuals such as hikers or military personnel typically carry salt, the present invention only requires that the individual carry extra salt, some or all of which may be integral to the brine compartment.

Since the amount of oxidant provided does not depend heavily on the salt concentration in the brine, the present invention does not require an accurate measurement system for generating brine solution 136. This reduces the complexity of the apparatus, which, in turn, reduces its costs and increases system reliability and functionality.

Furthermore, the current that passes through salt solution 136 can vary significantly provided a minimum charge passes through salt solution 136. Excess charge leads to excess oxidants being generated, which the user can tolerate. The excess oxidants do not adversely affect the taste of the final drinking water or harm the user. However, the present invention limits the excess oxidants.

Figure 1:
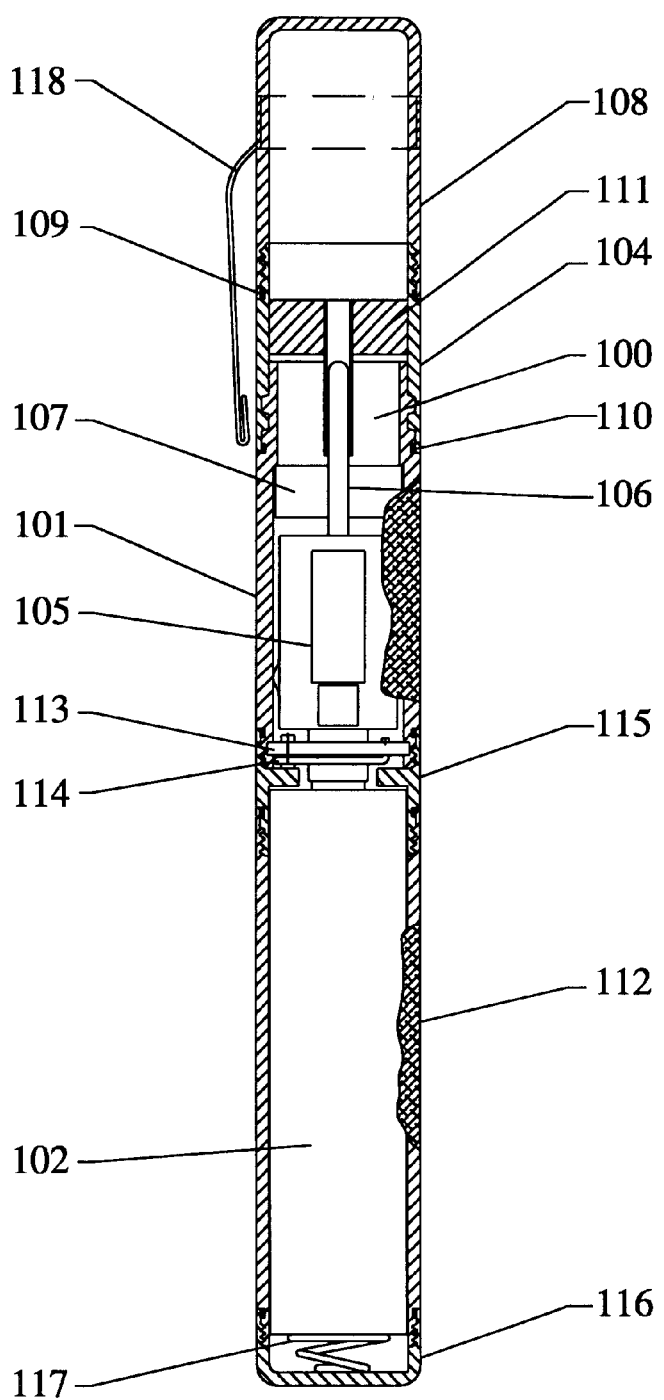
FIG. 1 is a cut-away view of the preferred embodiment of an oxidant generator according to the present invention.

The preferred embodiment of the present invention, shown in FIG. 1, comprises four primary components: electrolytic cell 100, power source 102, brine well 104, and integral circuit 105 for system control and measuring the total dissolved solids (TDS) in the source water to be treated. Alternately, the system control circuit can be used for measuring the TDS of the brine solution. In this preferred embodiment, cell 100 comprises outer housing 101 comprising cylindrical conducting wall that forms the anode of electrolytic cell 100. Cathode 106 is suspended inside outer housing 101 by spacer 107. In an alternative embodiment of the present invention, the cathode may be outer housing 101, and the anode may be central shaft 106. In the preferred embodiment of the present invention, the cell housing comprises a plastic, ceramic, silicone, or some other non-conducting material, and anode (as the outer electrode) comprises a titanium substrate (physically or chemically attached to the cell housing) with a Group VIII catalyst coating on the titanium substrate with conducting leads to the power source. An aliquot of brine is held in electrolytic cell 100 during the time the current passes between the anode and cathode. The term "pen" is used throughout the specification and claims interchangeably to describe a handheld device as shown in the drawings. The manner in which the aliquot of brine is generated and held in place is discussed in more detail below. After the current has passed through the brine, the aliquot of treated brine, now partially or completely converted to oxidant, is expelled from electrolytic cell 100 in to the fluid to be treated. Unconverted brine solution that is introduced into the drinking water source is at a very dilute ratio and typically will not be tasted due to the low concentration.

Figure 2:
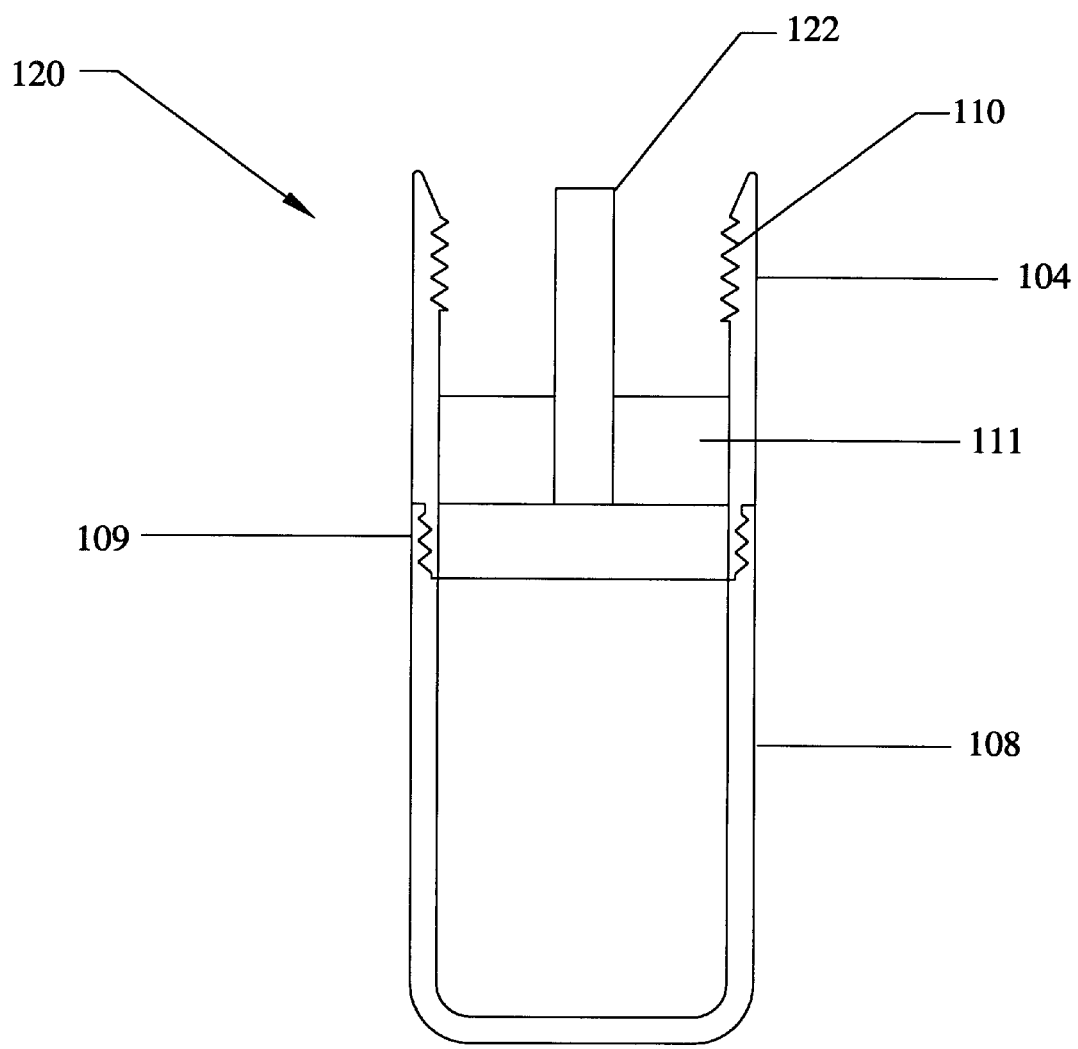
FIG. 2 is a cross-sectional view of the preferred embodiment of the present invention that incorporates a salt storage cap, salt strainer, brine mixing well, and cathode scraper.

In the preferred embodiment of the present invention, spacer 107 is also preferably a seal. Most preferably, cathode 106 is supported by spacer 107 which is sealed to outer housing 101. Further describing the preferred embodiment, brine generator assembly 120 of FIG. 2 comprises brine well 104 together with salt storage container 108 which are sealed together at joint 109 and are removed from "pen" via threaded joint 110. With brine generator assembly 120 removed, water is poured in electrolytic cell 100 (FIG. 1). Referring again to FIG. 2, brine generator assembly 120 is re-installed on "pen" assembly. "Pen" assembly is shaken to allow water in electrolytic cell 100 to migrate through salt filter 111 so that water mixes with salt in salt storage container 108, thereby dissolving salt and making a salt brine solution. Holding "pen" upright, brine solution settles in electrolytic cell 100. "Pen" assembly is then ready for activation to produce oxidants via electrolysis. Activation occurs via electrical switch contact with integral circuit 105. In the preferred embodiment, switch activation occurs when power housing 112 is rotated relative to outer housing 101. Alternate switch embodiments include other switch configurations known to those versed in electrical switches. Spring retention plate 113 is captivated via locking tabs with anode 101. Torsion spring 114 returns outer housing 101 to resting position relative to power housing 112 via connector 115. With switch closure, in the preferred embodiment, integral circuit 105 releases a prescribed amount of electrical energy from power source 102 to brine solution in electrolytic cell 100. When the prescribed amount of electrical power is applied to brine in electrolytic cell 100, integral circuit 105 preferably actives electrical device for creating an audible, visual, or tactile feedback to notify operator that electrolysis is complete. Alternate embodiments include manual or mechanical means to meter electrical energy to cell 100. Brine generator assembly 120 of FIG. 2 is removed from "pen" and contents of electrolytic cell 100 (FIG. 1) are poured into container of fluid to be treated, such as a canteen, to provide disinfection. Referring again to FIG. 2, brine well 104 incorporates hollow cathode scraper 122 which serves to scrape contaminants off of cathode element (e.g. cathode 106 in FIG. 1) when brine generator assembly 120 is installed on tip of "pen".

In the preferred embodiment, power source 102 comprises an inductive coil device for generating electricity for storage in an energy storage device. In an alternative embodiment of the present invention, power source 102 comprises batteries. Power source 102 is retained in power housing 112 via compression spring 117 and end cap 116. To retain "pen" assembly in users pocket or other storage container, pocket clip 118 is attached to "pen" assembly.

Water sources with high levels of total dissolved solids (TDS), e.g. sea water, can be detrimental to human health due to the ion imbalance set up in the human system. TDS can be measured by knowing the specific conductance of the solution. Because the disinfection "pen" apparatus of the present invention has an anode and cathode in the cell chamber, the "pen" apparatus can incorporate an electrical circuit within integral circuit 105 (FIG. 1) to measure the specific conductance of the water to be treated. This provides a means for the operator to know if the water collected for treatment is suitable for drinking. In practice, the operator purges the "pen" cell with the source water to remove any residual brine or oxidant. In the preferred embodiment of the present invention, water is then taken into cell chamber 100 and the TDS circuit is activated. The TDS circuit activates a display or unique vibrating mode that indicates to the operator the quality of the source water. For water that is nominally below 1000 milligrams per liter (mg/L) TDS, the water is safe to drink. Further processing of the water may be required if the TDS is greater than 1000 mg/L. In the preferred embodiment of this disinfection "pen" apparatus, a circuit is included in integral circuit 105 for measuring the TDS of the source water. Because TDS measurement is dependent on the temperature of the source water, a temperature measuring device is also incorporated in the cell chamber of the "pen".

Figure 4:
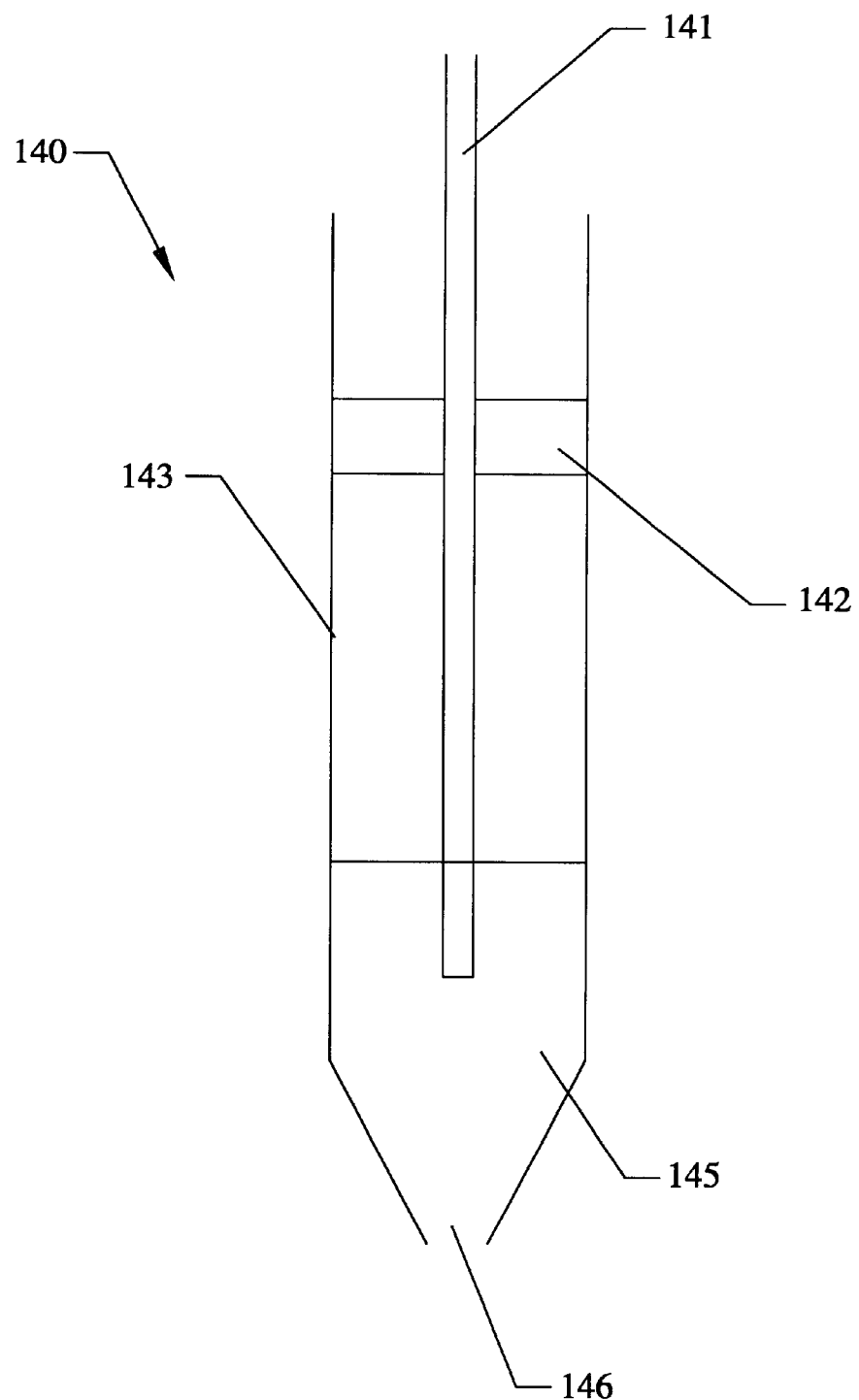
FIG. 4 is a cross-sectional view of another embodiment of the electrolytic cell used in the present invention.

In an alternative embodiment of the present invention, shown at 140 in FIG. 4, cathode 141 is fixed relative to seal 142, which together, move relative to anode 143. Hence, when the cathode assembly comprising cathode 141 and seal 142 moves downward, the treated brine is forced out of syringe-type apparatus 140 through opening 146. The same mechanism can be used to draw an aliquot of brine from a brine container into body 145 prior to passing current through the brine.

Figure 5:
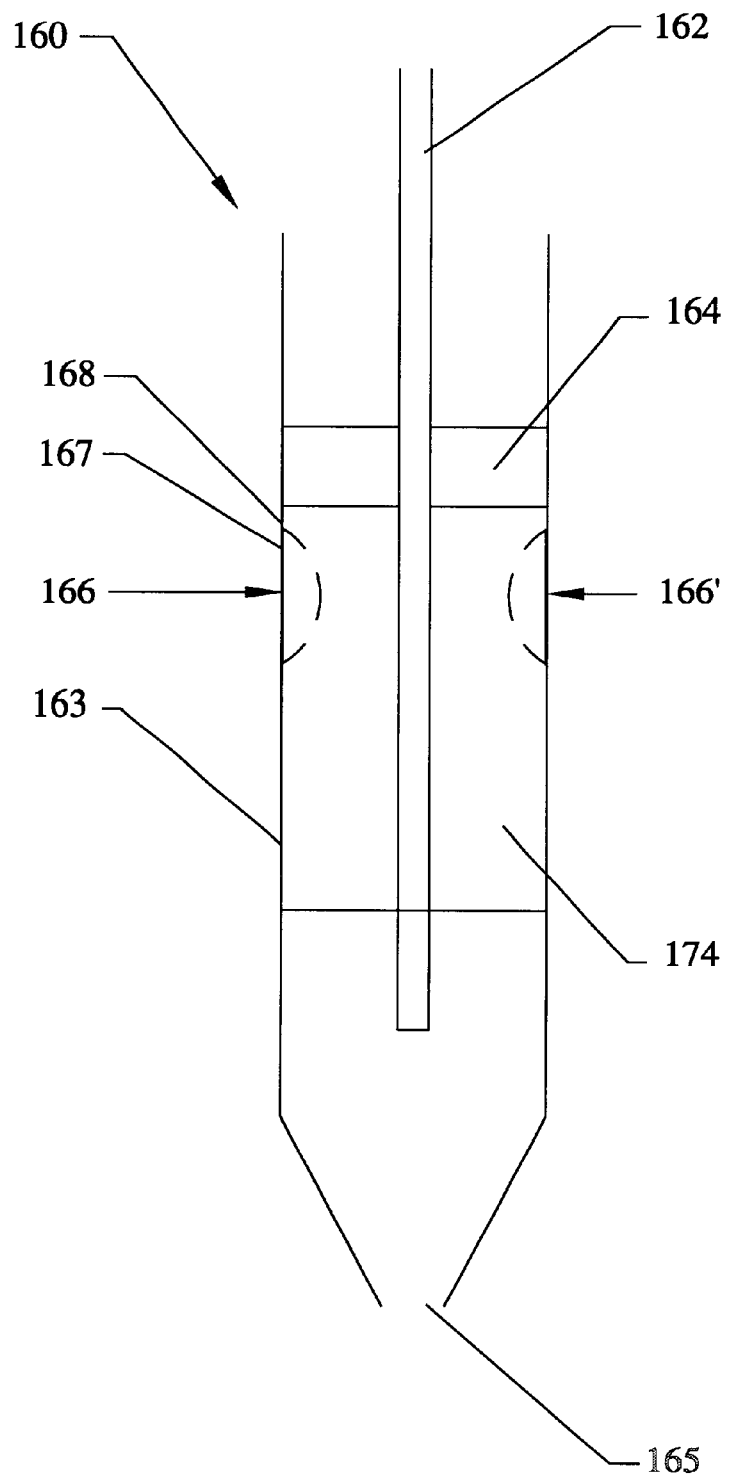
FIG. 5 is a cross-sectional view of another embodiment of the electrolytic cell used in the present invention.

In an alternative embodiment 160 of the present invention, shown in FIG. 5, cathode 162 and seal 164 remain fixed relative to anode 163. Deformable member 167 is disposed in the wall of anode 163. When pressure is applied to member 167 in the direction shown 166,166', member 167 deforms inward at 168 thereby forcing the contents of anode chamber 163 out of body 174 through opening 165. When the pressure is relieved, air or liquid is sucked back into body 174 through opening 165.

As noted above, the amount of oxidant that is formed depends primarily on the total current that passes through the brine solution. Hence, the salt concentration and volume of brine treated do not directly determine the sterilization capacity of the treated brine. In the preferred embodiment of the present invention, the power source includes an energy storage device that is charged and then discharged through the brine solution. This arrangement assures reproducible oxidant generation.

Figure 6:
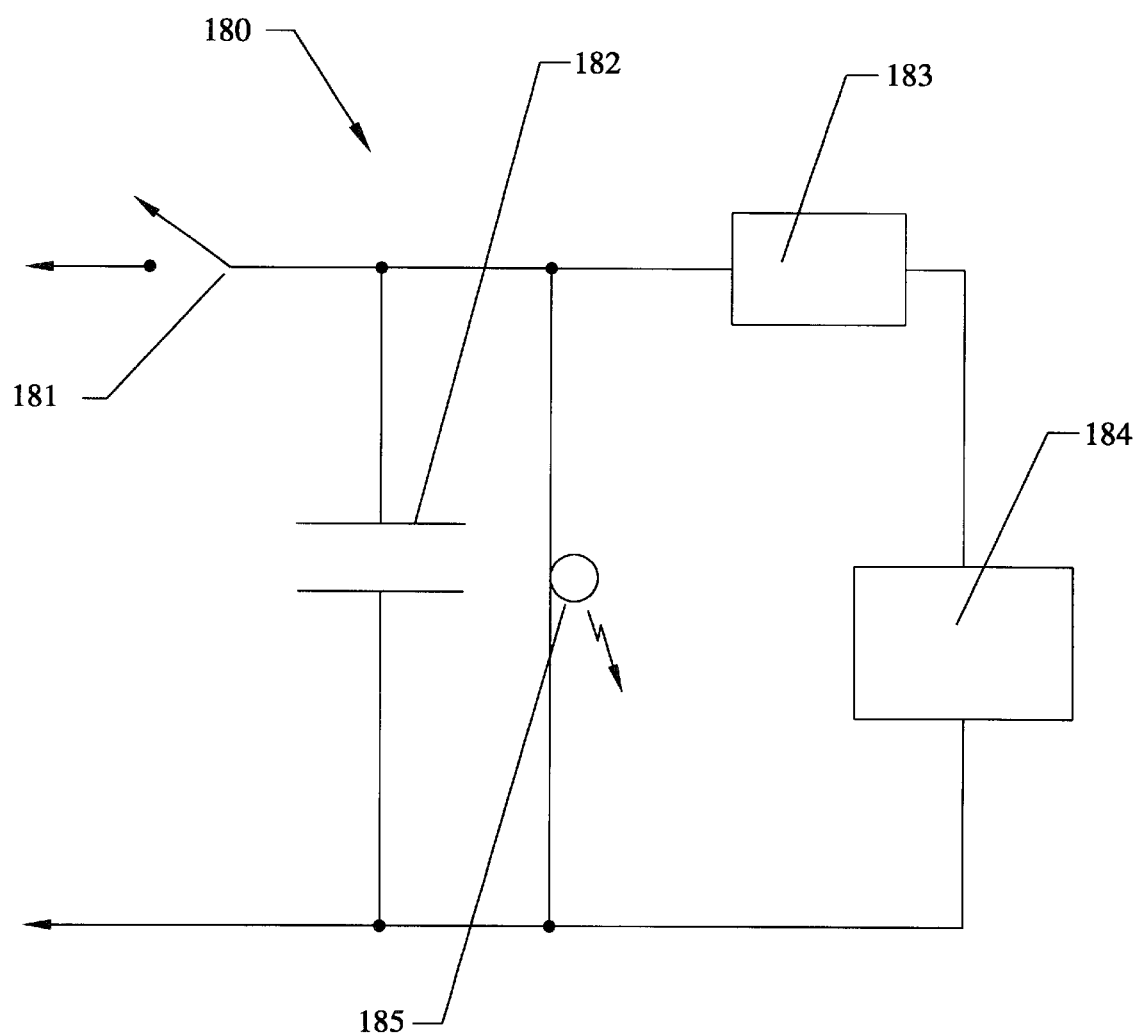
FIG. 6 is a schematic drawing of a power source for use in the present invention.

FIG. 6 is a schematic drawing of a preferred embodiment of power source 180 according to the present invention. Power source 180 comprises energy storage device 182, which is pumped to a predetermined voltage by charge pump 184. Voltage regulator 183 can be utilized to assure that the energy storage device is properly charged. Indicator 185 signals the user when the desired charge has been obtained. At this point, the user closes switch 181 thereby causing the energy storage device to discharge through the brine solution.

Charge pump 184 may utilize a battery. With battery power, a power conditioning circuit may be used to control power to the cell. In the preferred embodiment of the present invention, the power conditioning circuit includes a timing device such that once triggered by the operator, current is delivered to the cell. Once triggered, the circuit delivers energy to the cell until the proper amount of current is delivered. The circuit then activates a visual, audible, or actile device, or other signaling device that notifies the operator that the oxidant is ready for introduction into the water to be treated. A mechanical device that converts mechanical motion to electricity is preferred. For example, charge pump 184 may be constructed from a permanent magnet that is caused to pass back and forth through a coil when the user shakes the pen back and forth. Similarly, a piezoelectric based actuator may be utilized to pump charge when a piezoelectric member is deformed by mechanical forces applied by the user. In another embodiment of the present invention, the power source for the disinfection "pen" can be an external source such as batteries, solar panels, manually driven electric generator, or any other means of delivering electrical power to the apparatus.

Figure 7:
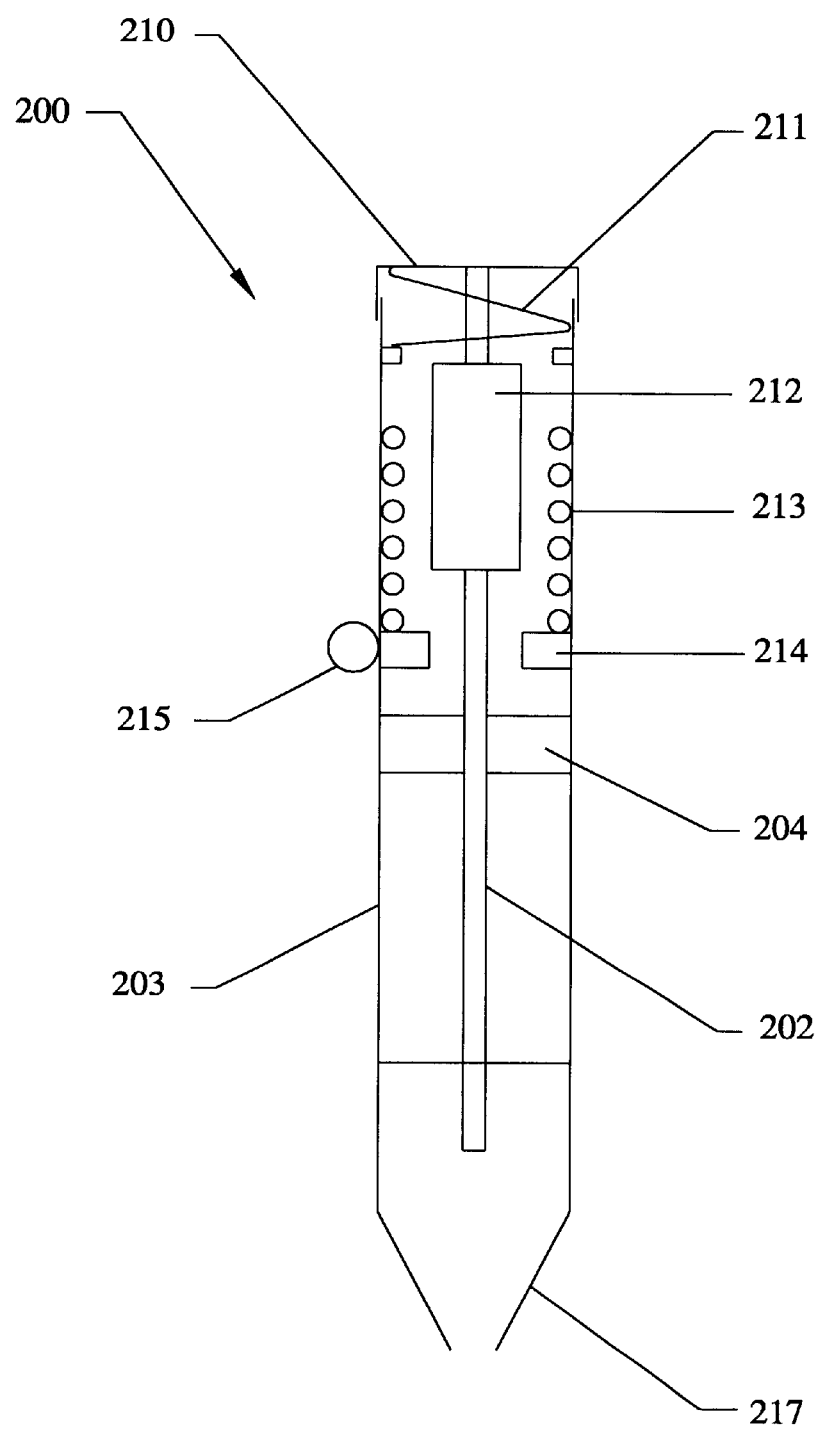
FIG. 7 is a cross-sectional view of an alternative embodiment of the present invention that utilizes a mechanical system for converting mechanical energy to charge an energy storage device shown in FIG. 6.

FIG. 7 is a cross-sectional view of an embodiment of the present invention that utilizes a mechanical system for converting mechanical energy to charge the energy storage device. Oxidant generator 200 comprises cathode 202, which moves with seal 204 within the body of the device. Upper portion of cathode 202 is attached to moveable cap 210, which slides relative to anode 203 when pressure is applied to cap 210. Return spring 211 causes cap 210 to move in the opposite direction when pressure is released. Magnet 212 is located on cathode 202 and moves therewith. Alternately, magnet 212 may move relative to cathode 202 via physical movement of the pen. The motion of cap 210 causes magnet 212 to move within coil 213 thereby generating a flow of electricity for charging a circuit in electronics assembly 214. When the energy storage device is fully charged, indicator 215 activates. A saline solution is then drawn into the body of the oxidant generator by pressing on cap 210, immersing end 217 in the brine solution, and then releasing cap 210. A switch on generator 200 discharges the stored energy through the brine solution. The oxidants generated by the discharge of the electrical energy are then expelled into the container of drinking water by again depressing cap 210.

The simplest method for generating the brine solution involves dissolving conventional salt or salt tablets in a small amount of water. As noted above, the individuals who are most likely to use the present invention typically carry salt to replace salt lost through perspiration. Salt can be placed in a suitable container with an amount of water. After the salt dissolves, an aliquot of the salt solution is then poured or drawn into the electrolytic cell described above. The remaining salt solution may be ingested by the user to replace salt lost by perspiration. If this procedure is followed, the present invention does not require the user to carry any additional salt.

The present invention may also include a salt reservoir. In such embodiments, a reservoir having solid salt and brine compartment therein is provided as part of the oxidant generator. As noted above, the amount of oxidant generated is independent of the salt concentration over a wide range of concentrations. Accordingly, the salt reservoir only needs to assure that sufficient salt is introduced into the water drawn into the generator to put the salt concentration in the useable range.

Figure 8:
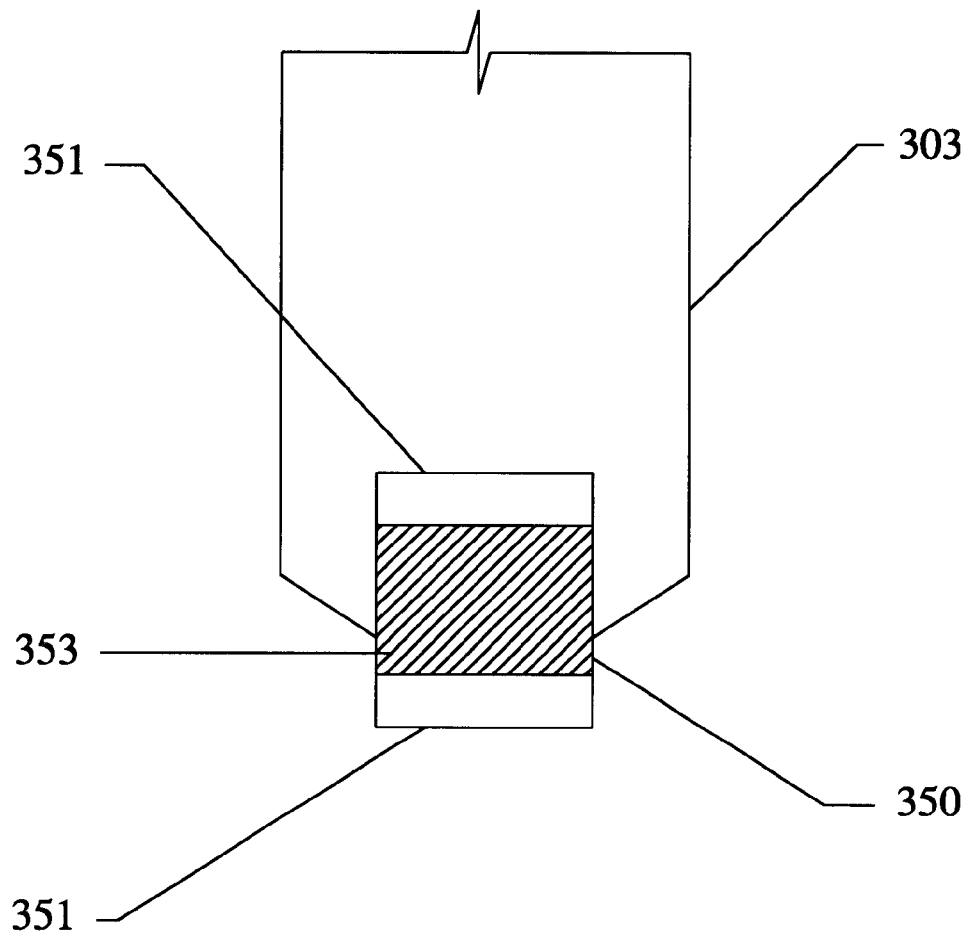
FIG. 8 is a cross-sectional view of an alternative embodiment of the present invention that utilizes a salt reservoir to generate the brine solution.

FIG. 8 illustrates an embodiment of the present invention, which includes a salt reservoir 350 which attaches at the end of cell chamber 303. Reservoir 350 has porous ends 351, which allow water to pass through reservoir 350 into the cell body. The porous ends retain salt 353. A portion of the salt dissolves when water is drawn into the chamber. After the charge is passed through the salt solution, the oxidants are expelled through the reservoir into the drinking water. When the salt in reservoir 350 is exhausted, the reservoir can be replaced by another disposable reservoir, or the reservoir can be refilled by the operator.

Figure 9:
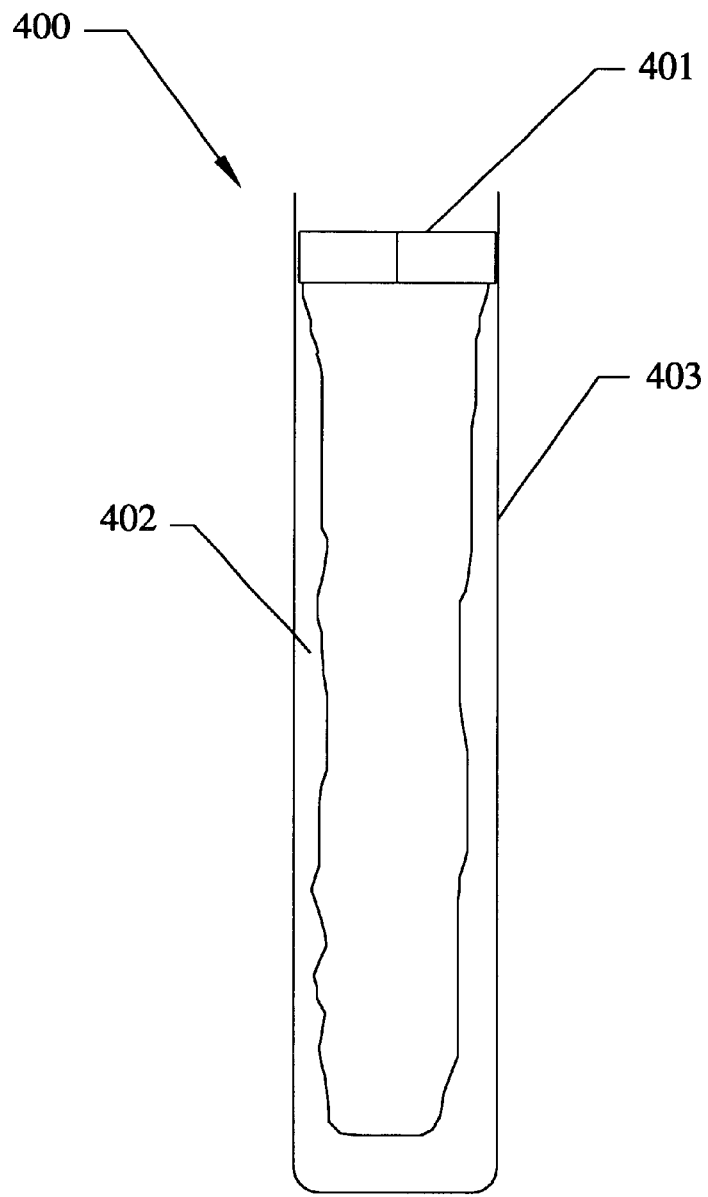
FIG. 9 is a cross-sectional view of an embodiment of the present invention that incorporates a brine capsule that is housed in the cap of the disinfection pen apparatus.

FIG. 9. shows an alternative embodiment at 400 which is otherwise attached to the body of the pen (e.g. see anode 101 in FIG. 1) in the normal storage configuration. Cap 403 may house a brine storage container 402 with self sealing cap 401. Self sealing cap 401 can be an elastomer device, or mechanical check valve device or other device commonly known by those versed in the design of sealing mechanisms. Container 402 may be rigid or flexible. If rigid, the brine container may also be cap 403. The brine container contains a concentration of pure brine. To load cell chamber 100 (FIG. 1) the "pen" tip enters through self sealing cap 401 and brine is drawn in the "pen" by any number of mechanisms described herein. When the "pen" is withdrawn, cap 401 re-seals. Brine container 402, or 403 (depending on configuration) can be a replaceable element to the disinfection "pen" apparatus.

The above-described embodiments of the present invention refer to an arrangement in which the cathode is a solid or tubular electrode within an outer body that acts as the anode and reaction chamber. However, it is obvious to those skilled in the art and from the preceding discussion that the cathode and anode can be reversed. Likewise, there may be multiple anodes and/or cathodes utilized in accordance with the present invention.

The above-described embodiments of the present invention utilize a circuit to fix the amount of charge that passes through the salt solution. An alternative embodiment requires the operator to press the discharge switch for a certain length of time rather than rely on a circuit. However, it is obvious to those skilled in the art and from the preceding discussion that any charge integrating device may be used to determine that the minimum charge has passed through the salt solution.

The above-described embodiments of the present invention utilize a reaction chamber comprising a cylindrical outer body with a concentric cathode electrode placed therein. However, it is obvious to those skilled in the art and from the preceding discussion that any chamber arrangement, which guarantees that the charge passes through the salt solution, may be utilized.

In another embodiment of the present invention, the cell chamber comprises two plates, one plate being the anode, and the other being the cathode. During generation of the oxidant, the anode product and cathode productions are selectively attracted to the anode and cathode plates. This process is described in U.S. Pat. No. 4,761,208 to Gram, et al entitled *Electrolytic Method and Cell for Sterilizing Water*, the teachings of which are incorporated herein by reference. By entering a flow dividing mechanism in the pen cell chamber between the anode and cathode plates, the anode and cathode product streams can be separated physically. By retaining the cathode stream from entering the water to be treated, the anode product only is used for disinfection. The anode product only has a lower pH concentration and stronger concentration of oxidants that would provide enhanced disinfection effectiveness to the treated water source.

Figure 10:
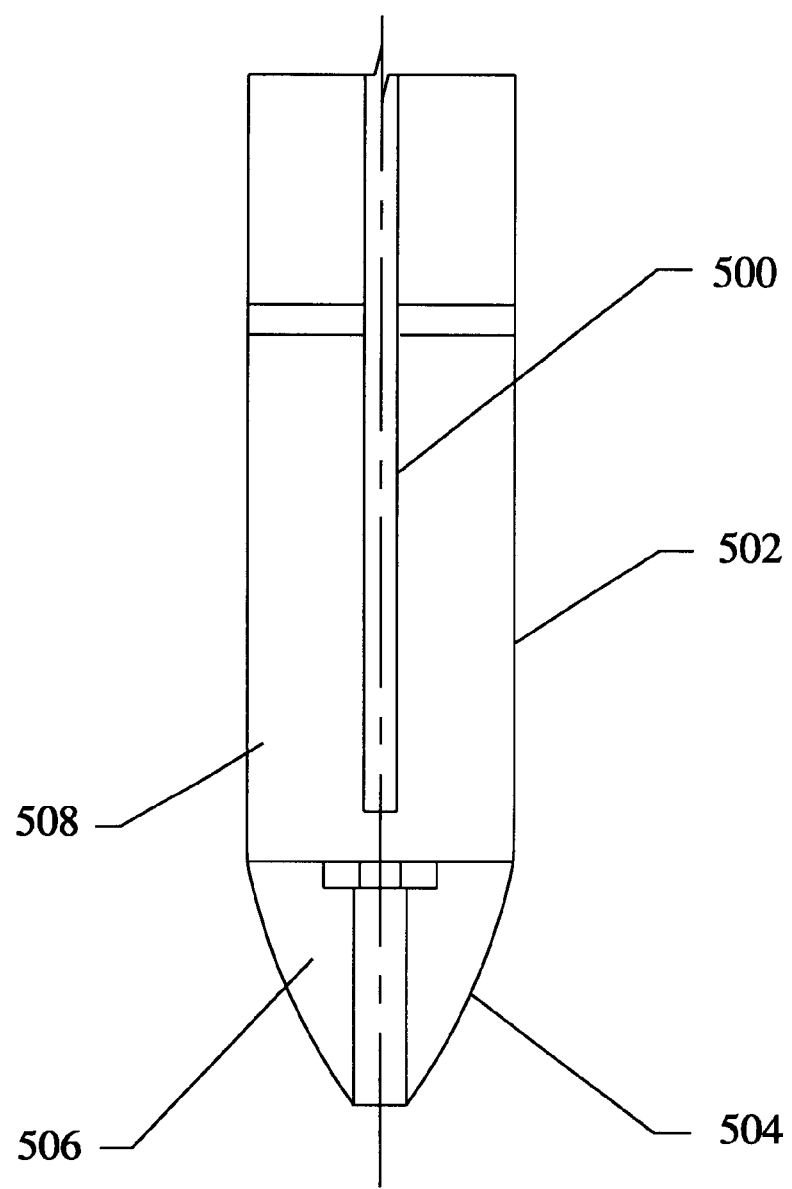
FIG. 10 is a cross-sectional view of an alternative embodiment of the present invention that shows a scraper mechanism in the tip of the disinfection pen to clean contaminants off of the cathode.

Because calcium carbonate is a common ingredient in most water sources, this element is likely to be present in the water solution that is used to make the brine feed stock for the cell. During electrolysis, calcium carbonate is typically formed on the cathode of the cell due to the high pH conditions present at the cathode surface. Calcium carbonate buildup on the cathode surface coats the cathode and causes the electrolysis process to be ineffective in the production of oxidants. In larger disinfection systems, calcium is removed from the cell water feed stream with an ion exchange water softening system. This would be impractical for the size application of the present invention. In the preferred embodiment of the present invention, "pen" tip 504, shown in FIG. 10 comprises annular scraper mechanism 506 that wipes calcium carbonate off of the walls of cathode shaft 500 relative to anode 502 as the syringe-type device is compressed to draw brine into cell compartment 508.

Figure 11:
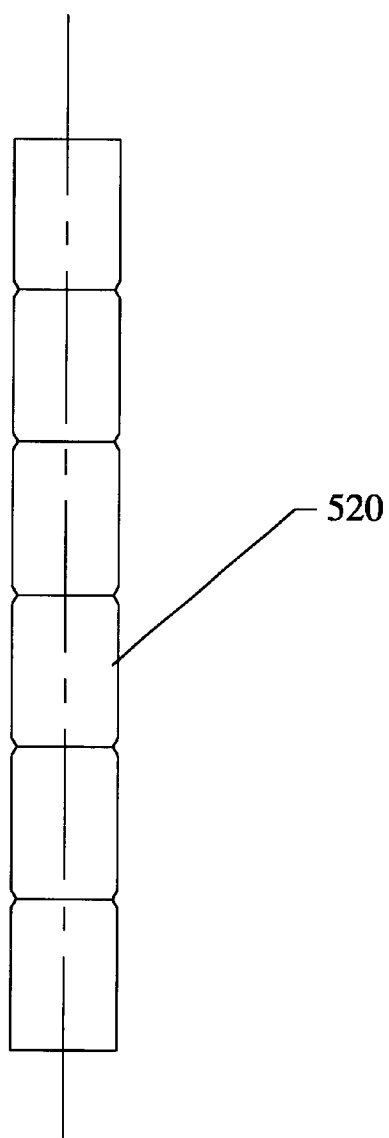
FIG. 11 is a cross-sectional view of an alternative embodiment of the present invention that shows the central cathode element of the apparatus with grooved segments.

In an alternative embodiment of the present invention, in order to eliminate calcium carbonate fouling, cathode shaft 520, such as shown in FIG. 11, comprises a multi-grooved shaft that is designed to have break-away segments. As each segment is "snapped off" by the operator, the shaft can be extended out of the elements of the syringe to expose new area of the cathode that has not been contaminated with calcium carbonate.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus to treat a substance, said apparatus comprising:
    a portable electrolytic cell for generating oxidation/reduction products, said products to be subsequently added to the substance;
    a power source;
    a chamber for holding an electrolyte;
    a delivery mechanism for providing said products to the substance to be treated; and wherein said apparatus comprises a syringe-like configuration.

2. The apparatus of claim 1 wherein said electrolytic cell comprises a plurality of plates.

3. The apparatus of claim 1 wherein said electrolytic cell comprises an anode and a cathode.

4. The apparatus of claim 3 wherein said anode comprises a catalytic material.

5. The apparatus of claim 4 wherein said anode comprises a titanium substrate.

6. The apparatus of claim 3 wherein said anode comprises an oxide coating.

7. The apparatus of claim 6 wherein said oxide coating comprises at least one metal selected from the Group VIII elements of the Periodic Table of the Elements.

8. The apparatus of claim 7 wherein said oxide coating comprises ruthenium oxide.

9. The apparatus of claim 3 wherein said cathode is disposed within said anode.

10. The apparatus of claim 3 wherein said cathode comprises an outer housing for said anode.

11. The apparatus of claim 3 wherein at least one of said anode and cathode comprises at least one substance selected from the group consisting of metallic, plastic, ceramic, silicone, and a non-conducting material.

12. The apparatus of claim 3 wherein said anode is disposed adjacent to said cathode.

13. The apparatus of claim 1 wherein said apparatus further comprises a pocket clip for attachment to a user's pocket.

14. The apparatus of claim 1 wherein said power source comprises at least one source selected from the group consisting of an electrical, solar, electro-mechanical, and chemical generator.

15. The apparatus of claim 14 wherein said power source further comprises a generator to convert mechanical energy to electrical energy.

16. The apparatus of claim 1 wherein said apparatus further comprises a reservoir.

17. The apparatus of claim 16 wherein said reservoir comprises a salt reservoir.

18. The apparatus of claim 1 wherein said chamber comprises a reservoir.

19. The apparatus of claim 18 wherein said reservoir comprises a refillable reservoir.

20. The apparatus of claim 16 wherein said reservoir comprises a disposable reservoir.

21. The apparatus of claim 1 further comprising an electrolyte storage compartment.

22. The apparatus of claim 21 wherein said electrolyte storage compartment is self-sealing.

23. The apparatus of claim 22 comprising at least one seal selected from the group consisting of an elastomer and a mechanical check valve.

24. The apparatus of claim 1 further comprising at least one deposit-removing apparatus.

25. The apparatus of claim 24 wherein said deposit-removing apparatus comprises at least one apparatus selected from the group consisting of a scraper and a shaft comprising break-away segments.

26. The apparatus of claim 1 further comprising a circuit for measuring total dissolved solids of a substance.

27. The apparatus of claim 26 wherein said circuit comprises an electrical circuit included in an integral circuit.

28. The apparatus of claim 26 further comprising a temperature measuring device.

29. The apparatus of claim 1 further comprising at least one indicator selected from the group consisting of visually readable, audible, and tactile to show completion of electric charge in the substance.

30. The apparatus of claim 29 wherein said indicator comprises a vibratory indicator.

31. A method for treating a substance using an oxidant generator, the method comprising the following steps:
   a) creating oxidation/reduction products in a portable electrolytic cell for holding an electrolyte wherein creating comprises generating an electrical current from an anode to a cathode, passing the electric current through the electrolyte and measuring the total dissolved solids of the substance; and
   b) releasing the products onto or into a substance for treating the substance.

32. The method of claim 31 wherein the step of releasing the products onto a substance for treating comprises releasing the oxidants onto a fluid.

33. The method of claim 31 wherein the step of releasing the products onto or into a substance for treating comprises releasing the oxidants into a substance for decontaminating.

34. The method of claim 31 wherein the step of creating oxidation/reduction products in a portable electrolytic cell for holding an electrolyte comprises creating oxidation/reduction products by passing water through a porous salt chamber to be collected in the cell.

35. The method of claim 31 wherein the step of creating oxidation/reduction products in a portable electrolytic cell for holding an electrolyte comprises creating oxidation/reduction products by pressing/pushing the end of the electrolytic cell comprising a self-sealing electrolyte storage compartment when electrolytic cell is inserted into the substance.

36. The method of claim 31 wherein the step of creating oxidation/reduction products in a portable electrolytic cell for holding an electrolyte comprises creating oxidation/reduction products by generating an electric current in an apparatus comprising a syringe-like configuration.

37. The method of claim 31 wherein the step of creating oxidation/reduction products in a portable electrolytic cell for holding an electrolyte comprises creating oxidants by generating an electric current in an electrolytic cell comprising a plurality of plates.

38. The method of claim 31 wherein the step of creating oxidation/reduction products in a portable electrolytic cell for holding an electrolyte comprises creating oxidation/reduction products by generating an electric current from an anode comprising a catalytic material.

39. The method of claim 31 wherein the step of creating oxidation/reduction products in a portable electrolytic cell for holding an electrolyte comprises creating oxidation/reduction products by generating an electric current from an anode comprising a titanium substrate.

40. The method of claim 31 wherein the step of creating oxidation/reduction products in a portable electrolytic cell for holding an electrolyte comprises creating oxidation/reduction products by generating an electric current from an anode further comprising an oxide coating.

41. The method of claim 40 wherein the step of creating oxidation/reduction products in a portable electrolytic cell for holding an electrolyte comprises creating oxidation/reduction products by generating an electric current from an anode comprising ruthenium oxide.

42. The method of claim 31 wherein the step of creating oxidation/reduction products in a portable electrolytic cell for holding an electrolyte comprises creating oxidation/reduction products by generating an electric current from an anode comprising at least one metal selected from the group consisting of the Group VIII elements in the Periodic Table of the Elements.

43. The method of claim 31 wherein the step of creating oxidation/reduction products in a portable electrolytic cell for holding an electrolyte comprises creating oxidation/reduction products in a reservoir.

44. An apparatus to treat a substance, said apparatus comprising:
   a portable electrolytic cell for generating oxidation/reduction products, said products to be subsequently added to the substance;
   a power source;
   a chamber for holding an electrolyte;
   a delivery mechanism for providing said products to the substance to be treated; and
   a disposable reservoir.

45. The apparatus of claim 44 wherein said disposable reservoir comprises an electrolyte reservoir.

46. The apparatus of claim 44 wherein said disposable reservoir holds a fluid.

47. The apparatus of claim 44 wherein said disposable reservoir holds a solid.

48. The apparatus of claim 44 wherein said apparatus comprises a syringe-like configuration.

49. The apparatus of claim 44 wherein said electrolytic cell comprises a plurality of plates.

50. The apparatus of claim 44 wherein said electrolytic cell comprises an anode and a cathode.

51. The apparatus of claim 50 wherein said anode comprises a catalytic material.

52. The apparatus of claim 51 wherein said anode comprises a titanium substrate.

53. The apparatus of claim 50 wherein said anode comprises an oxide coating.

54. The apparatus of claim 53 wherein said oxide coating comprises at least one metal selected from the Group VIII elements of the Periodic Table of the Elements.

55. The apparatus of claim 54 wherein said oxide coating comprises ruthenium oxide.

56. The apparatus of claim 50 wherein said cathode is disposed within said anode.

57. The apparatus of claim 50 wherein said cathode comprises an outer housing for said anode.

58. The apparatus of claim 50 wherein at least one of said anode and cathode comprises at least one substance selected from the group consisting of metallic, plastic, ceramic, silicone, and a non-conducting material.

59. The apparatus of claim 50 wherein said anode is disposed adjacent to said cathode.

60. The apparatus of claim 44 wherein said apparatus further comprises a pocket dip for attachment to a user's pocket.

61. The apparatus of claim 44 wherein said power source comprises at least one source selected from the group consisting of an electrical, solar, electro-mechanical, and chemical generator.

62. The apparatus of claim 61 wherein said power source further comprises a generator to convert mechanical energy to electrical energy.

63. The apparatus of claim 44 wherein said disposable reservoir comprises a salt reservoir.

64. The apparatus of claim 44 wherein said disposable reservoir comprises a refillable reservoir.

65. The apparatus of claim 44 further comprising an electrolyte storage compartment.

66. The apparatus of claim 65 wherein said electrolyte storage compartment is selfsealing.

67. The apparatus of claim 66 comprising at least one seal selected from the group consisting of an elastomer and a mechanical check valve.

68. The apparatus of claim 44 further comprising at least one deposit-removing apparatus.

69. The apparatus of claim 68 wherein said deposit-removing apparatus comprises at least one apparatus selected from the group consisting of a scraper and a shaft comprising break-away segments.

70. The apparatus of claim 44 further comprising a circuit for measuring total dissolved solids of a substance.

71. The apparatus of claim 70 wherein said circuit comprises an electrical circuit included in an integral circuit.

72. The apparatus of claim 70 further comprising a temperature measuring device.

73. The apparatus of claim 44 further comprising at least one indicator selected from the group consisting of visually readable, audible, and tactile to show completion of electric charge in the substance.

74. The apparatus of claim 73 wherein said indicator comprises a vibratory indicator.

75. An apparatus to treat a substance, said apparatus comprising:
a portable electrolytic cell for generating oxidation/reduction products, said products to be subsequently added to the substance;
a power source;
a chamber for holding an electrolyte wherein said chamber comprises a disposable reservoir; and
a delivery mechanism for providing said products to the substance to be treated.

76. The apparatus of claim 75 wherein said disposable reservoir comprises an electrolyte reservoir.

77. The apparatus of claim 75 wherein said disposable reservoir holds a fluid.

78. The apparatus of claim 75 wherein said disposable reservoir holds a solid.

79. An apparatus to treat a substance, said apparatus comprising:
a portable electrolytic cell for generating oxidation/reduction products, said products to be subsequently added to the substance;
a power source;
a chamber for holding an electrolyte;
a delivery mechanism for providing said products to the substance to be treated; and
a self-sealing electrolyte storage compartment.

80. The apparatus of claim 79 wherein said self-sealing electrolyte compartment comprises at least one seal selected from the group consisting of an elastomer and a mechanical check valve.

81. An apparatus to treat a substance, said apparatus comprising:
a portable electrolytic cell for generating oxidation/reduction products, said products to be subsequently added to the substance;
a power source;
a chamber for holding an electrolyte;
a delivery mechanism for providing said products to the substance to be treated; and
at least one deposit removing apparatus.

82. The apparatus of claim 81 wherein said at least one deposit removing apparatus comprises at least one apparatus selected from the group consisting of a scrapper and a shaft comprising break-away segments.

83. An apparatus to treat a substance, said apparatus comprising:
a portable electrolytic cell for generating oxidation/reduction products, said products to be subsequently added to the substance;
a power source;
a chamber for holding an electrolyte;
a delivery mechanism for providing said products to the substance to be treated; and
a circuit for measuring total dissolved solids of a substance.

84. The apparatus of claim 83, wherein said circuit comprises an electrical circuit included in an integral circuit.

85. The apparatus of claim 83 further comprising a temperature measuring device.

86. The apparatus of claim 83, wherein said substance comprises electrolyte.

87. A method for treating a substance using an oxidant generator, the method comprising the following steps:
creating oxidation/reduction products in a portable electrolytic cell for holding an electrolyte wherein creating comprises generating an electrical current from an anode to a cathode, passing the electric current through the electrolyte, and pressing/pushing the end of the electrolytic cell comprising a self-sealing electrolyte storage compartment when electrolytic cell is inserted into the substance; and
releasing the products onto or into a substance for treating the substance.

88. A method for treating a substance using an oxidant generator, the method comprising the following steps:
a) creating oxidation/reduction products in a portable electrolytic cell for holding an electrolyte in an apparatus comprising a syringe-like configuration and passing an electric current through the electrolyte; and b) releasing the products onto or into a substance for treating the substance.

89. The method of claim 88 wherein the step of releasing the products onto a substance for treating comprises releasing the oxidants onto a fluid.

90. The method of claim 88 wherein the step of releasing the products onto or into a substance for treating comprises releasing the oxidants into a substance for decontaminating.

91. The method of claim 88 wherein the step of creating oxidation/reduction products in a portable electrolytic cell for holding an electrolyte comprises creating oxidation/reduction products by passing water through a porous salt chamber to be collected in the cell.

92. The method of claim 88 wherein the step of creating oxidation/reduction products in a portable electrolytic cell for holding an electrolyte comprises creating oxidation/reduction products by pressing/pushing the end of the electrolytic cell comprising a self-sealing electrolyte storage compartment when electrolytic cell is inserted into the substance.

93. The method of claim 88 wherein the step of creating oxidation/reduction products in a portable electrolytic cell for holding an electrolyte comprises creating oxidation/reduction products by measuring the total dissolved solids of the substance.

94. The method of claim 88 wherein the step of creating oxidation/reduction products in a portable electrolytic cell for holding an electrolyte comprises creating oxidants by generating an electric current in an electrolytic cell comprising a plurality of plates.

95. The method of claim 88 wherein the step of creating oxidation/reduction products in a portable electrolytic cell for holding an electrolyte comprises creating oxidation/reduction products by generating an electric current from an anode comprising a catalytic material.

96. The method of claim 88 wherein the step of creating oxidation/reduction products in a portable electrolytic cell for holding an electrolyte comprises creating oxidation/reduction products by generating an electric current from an anode comprising a titanium substrate.

97. The method of claim 88 wherein the step of creating oxidation/reduction products in a portable electrolytic cell for holding an electrolyte comprises creating oxidation/reduction products by generating an electric current from an anode further comprising an oxide coating.

98. The method of claim 97 wherein the step of creating oxidation/reduction products in a portable electrolytic cell for holding an electrolyte comprises creating oxidation/reduction products by generating an electric current from an anode comprising ruthenium oxide.

99. The method of claim 88 wherein the step of creating oxidation/reduction products in a portable electrolytic cell for holding an electrolyte comprises creating oxidation/reduction products by generating an electric current from an anode comprising at least one metal selected from the group consisting of the Group VIII elements in the Periodic Table of the Elements.

100. The method of claim 88 wherein the step of creating oxidation/reduction products in a portable electrolytic cell for holding an electrolyte comprises creating oxidation/reduction products in a reservoir.

101. A method for treating a substance using an apparatus comprising an oxidant generator and a self-sealing electrolyte storage compartment, the method comprising the following steps:

creating oxidation/reduction products in a portable electrolytic cell from an electrolyte solution comprising electrolyte of the self-sealing electrolyte storage compartment; and releasing the products onto or into a substance for treating the substance.

102. A method for treating a substance using an apparatus comprising an oxidant generator and a disposable electrolyte reservoir, the method comprising the following steps:

creating oxidation/reduction products in a portable electrolytic cell from an electrolyte solution comprising electrolyte of the disposable electrolyte reservoir; and releasing the products onto or into a substance for treating the substance.

103. The method of claim 102 wherein the step of releasing the products onto a substance for treating comprises releasing the oxidants onto a fluid.

104. The method of claim 102 wherein the step of releasing the products onto or into a substance for treating comprises releasing the oxidants into a substance for decontaminating.

105. The method of claim 102 wherein the step of creating oxidation/reduction products in a portable electrolytic cell for holding an electrolyte comprises creating oxidation/reduction products by passing water through a porous salt chamber to be collected in the cell.

106. The method of claim 102 wherein the step of creating oxidation/reduction products in a portable electrolytic cell for holding an electrolyte comprises creating oxidation/reduction products by passing an electric current through an electrolyte.

107. The method of claim 106 wherein the step of creating oxidation/reduction products in a portable electrolytic cell for holding an electrolyte comprises creating oxidation/reduction products by generating an electric current from an anode to a cathode.

108. The method of claim 107 wherein the step of creating oxidation/reduction products in a portable electrolytic cell for holding an electrolyte comprises creating oxidation/reduction products by measuring the total dissolved solids of the substance.

109. The method of claim 107 wherein the step of creating oxidation/reduction products in a portable electrolytic cell for holding an electrolyte comprises creating oxidation/reduction products by pressing/pushing the end of the electrolytic cell comprising a self-sealing electrolyte storage compartment when electrolytic cell is inserted into the substance.

110. The method of claim 106 wherein the step of creating oxidation/reduction products in a portable electrolytic cell for holding an electrolyte comprises creating oxidation/reduction products by generating an electric current in an apparatus comprising a syringe-like configuration.

111. The method of claim 106 wherein the step of creating oxidation/reduction products in a portable electrolytic cell for holding an electrolyte comprises creating oxidants by generating an electric current in an electrolytic cell comprising a plurality of plates.

112. The method of claim 107 wherein the step of creating oxidation/reduction products in a portable electrolytic cell for holding an electrolyte comprises creating oxidation/reduction products by generating an electric current from an anode comprising a catalytic material.

113. The method of claim 107 wherein the step of creating oxidation/reduction products in a portable electrolytic cell for holding an electrolyte comprises creating oxidation/reduction products by generating an electric current from an anode comprising a titanium substrate.

114. The method of claim 107 wherein the step of creating oxidation/reduction products in a portable electrolytic cell for holding an electrolyte comprises creating oxidation/reduction products by generating an electric current from an anode further comprising an oxide coating.

115. The method of claim 114 wherein the step of creating oxidation/reduction products in a portable electrolytic cell for holding an electrolyte comprises creating oxidation/reduction products by generating an electric current from an anode comprising ruthenium oxide.

116. The method of claim 106 wherein the step of creating oxidation/reduction products in a portable electrolytic cell for holding an electrolyte comprises creating oxidation/reduction products by generating an electric current from an anode comprising at least one metal selected from the group consisting of the Group VIII elements in the Periodic Table of the Elements.

117. The method of claim 102 wherein the step of creating oxidation/reduction products in a portable electrolytic cell for holding an electrolyte comprises creating oxidation/reduction products in a reservoir.

\* \* \* \* \*

UNITED STATES PATENT AND TRADEMARK OFFICE
CERTIFICATE OF CORRECTION

PATENT NO. : 6,261,464 B1
DATED : July 17, 2001
INVENTOR(S) : Rodney E. Herrington, Curtis M. Mitchke, John K. Hickerson, Timothy A. Cushman and John F. White It is certified that error appears in the above-identified patent and that said Letters Patent is hereby corrected as shown below:

Column 10,
Line 56, please insert a space between "apparatus" and "further".

Column 13,
Line 12, please replace "dip" with -- clip --.

Signed and Sealed this

Twenty-ninth Day of January, 2002

Attest:

Attesting Officer

JAMES E. ROGAN
Director of the United States Patent and Trademark Office